Patented Dec. 8, 1942

2,304,728

UNITED STATES PATENT OFFICE 2,304,728

STABILIZATION OF POLYMERIZABLE VINYL AROMATIC COMPOUNDS

Raymond F. Boyer and Louis C. Rubens, Midland, Mich., assignors to The Dow Chemical Company, Midland, Mich., a corporation of Michigan No Drawing. Application November 28, 1941, Serial No. 420,814

11 Claims. (Cl. 260—669)

This invention concerns a method for stabilizing vinyl aromatic compounds, i. e. styrene and its homologs and analogs, and the resultant stabilized compositions.

It is well known that styrene and other polymerizable vinyl aromatic compounds are difficult to purify and handle due to their tendency to polymerize upon being heated or upon standing at ordinary room temperatures. Since the development of valuable and reproducible properties in the polymers of these compounds depends upon the polymerization being carried out under carefully controlled conditions, premature or uncontrolled polymerization of the vinyl aromatic compounds, even though of only slight degree, may seriously affect the properties, e. g. solubility in solvents, flexibility and toughness, of the final polymers.

An object of this invention is to provide a method and agents for inhibiting, i. e for catalyzing negatively, the polymerization of vinyl aromatic compounds and also to provide the stabilized compositions from which the stabilizing agent may, when desired, be removed without difficulty to recover the vinyl aromatic compound in readily polymerizable condition. Other objects will be apparent from the following description of the invention.

We have discovered that a vinyl aromatic compound may effectively be stabilized against polymerization by dissolving therein a monohydric halo-nitrophenol having the general formula:

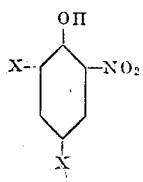

wherein one X represents a halogen and the other X represents a member of the group consisting of hydrogen and halogen and nitro substituents. We have further found that halo-nitrophenols having the above formula which contain at least one nitro substituent in the position ortho to the hydroxyl group and which, for the sake of convenience, are hereinafter referred to as halo-ortho-nitrophenols, are far more effective as agents for inhibiting the polymerization of vinyl aromatic compounds than are corresponding phenolic compounds wherein the halogen or the ortho-nitro radical is omitted.

Among the various halo-ortho-nitrophenols which may be employed either alone or in combination for such purpose are 2-nitro-4-chlorophenol, 2-nitro-4.6 - dichlorophenol, 2 - nitro-6-bromophenol, 2-nitro-4-bromophenol, 2-nitro-4.6-dibromophenol, 2-nitro-4-bromo - 6 - chlorophenol, 2-nitro-4-chloro-6-bromophenol, 2.6-di- nitro-4-bromophenol, and 2.6-dinitro-4-chlorophenol. Among the vinyl aromatic compounds which may be stabilized against polymerization by treatment with the halo-ortho-nitrophenols are styrene, divinyl-benzene, alpha-methyl-styrene, para-methyl-styrene, ethyl-vinyl-benzene, vinyl-naphthalene, para-chloro-styrene, etc.

The halo-ortho-nitrophenols are effective stabilizers for vinyl aromatic compounds at elevated temperatures, e. g. 100° to 200° C., as well as at ordinary room temperatures and may be used, if desired, to retard polymerization of the vinyl aromatic compound during distillation as well as during storage and shipment.

Although the amount of halo-ortho-nitrophenol used in any particular instance will, of course, depend on the particular vinyl aromatic compound being stabilized, the relative effectiveness of the particular halo-ortho-nitrophenol used and the conditions of time and temperature under which it is desired to stabilize the vinyl aromatic compound, usually from 0.001 to 5.0 per cent, and preferably from 0.05 to 1.0 per cent of the inhibitor, based upon the weight of vinyl aromatic compound, is sufficient to effect stabilization. The halo-ortho-nitrophenol may, of course, be employed in larger amounts, if desired. The halo-ortho-nitrophenol may be introduced into the vinyl aromatic compound in any convenient manner, e. g. by stirring or by warming or both.

After storage or shipment of the stabilized composition, the vinyl aromatic compound may be separated from the halo-ortho-nitrophenol and be recovered in readily polymerizable form by distillation or in any other convenient manner.

It should be mentioned that the inhibitors may be employed in proportions sufficient to stabilize the vinyl aromatic compound at room temperature, or thereabout, but in proportions insufficient to prevent polymerization at elevated temperatures, in which case the stabilized vinyl aromatic compound may, when desired, be heated to produce polymeric products without removal of the stabilizing agent. The proportion of the inhibitor required for this purpose is usually less than 0.1 per cent, the optimum proportion depending of course on the vinyl aromatic compound to be stabilized, the particular inhibitor used, and the temperature at which the polymerization is to be effected. For example styrene may be stabilized against polymerization at room temperature by treatment with 0.06 per cent of 2-nitro-4-bromo-6-chlorophenol and the stabilized styrene may, if desired, be polymerized readily by heating at 110° C. When larger amounts, e. g. from 0.5 to 1.0 per cent, of the more effective inhibitors, for example, of 2-nitro-4-chlorophenol, 2-nitro-4-bromo-6-chlorophenol, 2-nitro-4.6-dichlorophenol, 2 - nitro-4.6 - dibromophenol, 2.6-dinitro-4-chlorophenol, are used to inhibit polymerization of the vinyl aromatic compound it becomes impractical to polymerize the latter without first removing the inhibitor by distillation or otherwise as noted above.

The following table shows the results obtained in a series of tests on the effectiveness of several of the inhibitors mentioned. In securing this data, separate samples of styrene were treated with 0.5 per cent by weight of the respective inhibitors noted and the samples were then placed in separate flasks and maintained at 100° C. for 22 days. Observations on the viscosity of the various samples were made at frequent intervals and the number of days required for the samples to increase appreciably in viscosity was noted in each instance. By way of comparison, the values obtained with styrene alone and with styrene containing, respectively, phenol, nitrobenzene, 2-nitrophenol, 3-nitrophenol, and 4-nitrophenol are also included in the table.

Table

| Experiment No. | Inhibitor used | Days at 100° C. for sample to become slightly viscous |
| --- | --- | --- |
| 1 | 2-nitro-4-chlorophenol | 22. |
| 2 | 2-nitro-4-bromo-6-chlorophenol | More than 22. |
| 3 | 2-nitro-4.6-dichlorophenol | 22. |
| 4 | 2-nitro-4.6-dibromophenol | More than 22. |
| 5 | 2.6-dinitro-4-chlorophenol | Do. |
| 6 | Phenol | Less than 1. |
| 7 | Nitrobenzene | 2. |
| 8 | 2-nitrophenol | 14. |
| 9 | 3-nitrophenol | 4. |
| 10 | 4-nitrophenol | 1. |
| 11 | None | Less than 1. |

Other modes of applying the principle of the invention may be employed instead of those explained, change being made as regards the method or compounds herein disclosed, provided the steps or compounds stated by any of the following claims, or the equivalent of such stated steps or compounds be employed.

We therefore particularly point out and distinctly claim as our invention:

1. A liquid composition comprising a vinyl aromatic compound and a halo-ortho-nitrophenol having the general formula:

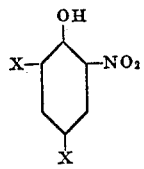

wherein one X represents a halogen and the other X represents a member of the group consisting of hydrogen and halogen and nitro substituents.

2. A liquid composition comprising a vinyl aromatic compound together with from 0.001 to 5.0 per cent of a halo-ortho-nitrophenol having the general formula:

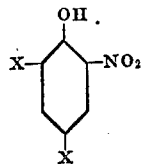

wherein one X represents a halogen and the other X represents a member of the group consisting of hydrogen and halogen and nitro substituents.

3. A liquid composition comprising a vinyl aromatic compound together with from 0.05 to 1.0 per cent of a halo-ortho-nitrophenol having the general formula:

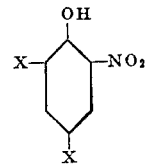

wherein one X represents a halogen and the other X represents a member of the group consisting of hydrogen and halogen and nitro substituents.

4. A liquid composition comprising a vinyl aromatic compound and a proportion of 2-nitro-4-chlorophenol sufficient to inhibit polymerization of the vinyl aromatic compound.

5. A liquid composition comprising a vinyl aromatic compound and a proportion of 2-nitro-4-bromo-6-chlorophenol sufficient to inhibit polymerization of the vinyl aromatic compound.

6. A liquid composition comprising a vinyl aromatic compound and a proportion of 2-nitro-4.6-dibromophenol sufficient to inhibit polymerization of the vinyl aromatic compound.

7. A liquid composition comprising styrene together with from 0.05 to 1.0 per cent of a halo-ortho-nitrophenol having the general formula:

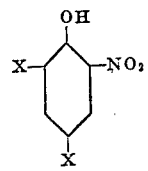

wherein one X represents a halogen and the other X represents a member of the group consisting of hydrogen and halogen and nitro substituents.

8. A liquid composition comprising styrene and a proportion of 2-nitro-4-chlorophenol sufficient to inhibit polymerization of the styrene.

9. A liquid composition comprising styrene and a proportion of 2-nitro-6-chloro-4-bromophenol sufficient to inhibit polymerization of the styrene.

10. A liquid composition comprising styrene and a proportion of 2-nitro-4.6-dibromophenol sufficient to inhibit polymerization of the styrene.

11. A method for stabilizing a polymerizable vinyl aromatic compound which comprises dissolving therein a halo-ortho-nitrophenol having the general formula:

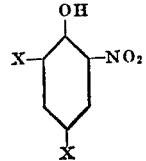

wherein one X represents a halogen and the other X represents a member of the group consisting of hydrogen and halogen and nitro substituents.

RAYMOND F. BOYER.
LOUIS C. RUBENS.